United States Patent
Singh et al.

(10) Patent No.: US 9,229,839 B2
(45) Date of Patent: Jan. 5, 2016

(54) IMPLEMENTING RATE CONTROLS TO LIMIT TIMEOUT-BASED FAULTS

(71) Applicant: Microsoft Corporation, Redmond, WA (US)

(72) Inventors: Abhishek Singh, Redmond, WA (US); Srikanth Raghavan, Sammamish, WA (US); Ajay Mani, Woodinville, WA (US); Saad Syed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 13/737,430

(22) Filed: Jan. 9, 2013

(65) Prior Publication Data

US 2014/0195861 A1 Jul. 10, 2014

(51) Int. Cl.
*G06F 11/00* (2006.01)
*G06F 11/34* (2006.01)
*G06F 11/07* (2006.01)

(52) U.S. Cl.
CPC .......... *G06F 11/3466* (2013.01); *G06F 11/076* (2013.01); *G06F 11/0757* (2013.01)

(58) Field of Classification Search
CPC .............. G06F 11/0757; G06F 11/076; G06F 11/0709; G06F 11/3006; G06F 11/3048; G06F 11/3466
USPC .................................. 714/47.2, 55, 704, 708
See application file for complete search history.

(56) References Cited

U.S. PATENT DOCUMENTS

| | | | |
|---|---|---|---|
| 6,526,433 B1 * | 2/2003 | Chang et al. ................... | 709/201 |
| 7,206,836 B2 | 4/2007 | Dinker et al. | |
| 7,493,394 B2 * | 2/2009 | Zavalkovsky et al. ........ | 709/225 |
| 7,953,870 B1 * | 5/2011 | Reeves et al. ................. | 709/228 |
| 8,639,834 B2 * | 1/2014 | Baratakke et al. ............. | 709/232 |
| 2002/0152446 A1 * | 10/2002 | Fleming ........................ | 714/815 |
| 2008/0082142 A1 * | 4/2008 | Clark et al. .................... | 607/60 |
| 2010/0211959 A1 * | 8/2010 | Chan et al. .................... | 718/107 |
| 2011/0106940 A1 * | 5/2011 | Chauvin et al. ............... | 709/224 |
| 2013/0031424 A1 * | 1/2013 | Srivastava et al. ............ | 714/47.2 |
| 2013/0124752 A1 * | 5/2013 | Griffith et al. ................ | 709/235 |
| 2014/0101419 A1 * | 4/2014 | Giddi .............................. | 713/1 |

OTHER PUBLICATIONS

Xiong, et al., "A Self-tuning Failure Detection Scheme for Cloud Computing Service", In Proceedings of IEEE 26th International Parallel and Distributed Processing Symposium, May 21, 2012, 12 pages.

(Continued)

*Primary Examiner* — Marc Duncan
(74) *Attorney, Agent, or Firm* — Ben Tabor; Harri Valio; Micky Minhas (57) ABSTRACT

Embodiments are directed to implementing rate controls to limit faults detected by timeout and to learning and adjusting an optimal timeout value. In one scenario, a computer system identifies cloud components that have the potential to fail within a time frame that is specified by a timeout value. The computer system establishes a number of components that are allowed to fail during the time frame specified by the timeout value and further determines that the number of component failures within the time frame specified by the timeout value has exceeded the established number of components that are allowed to fail. In response, the computer system increases the timeout value by a specified amount of time to ensure that fewer than or equal to the established number of components fail within the time frame specified by the timeout value.

20 Claims, 5 Drawing Sheets

(56) References Cited

OTHER PUBLICATIONS

Abmar Grangeiro De Barros, "ZooKeeper Failure Detector Model", Retrieved on: Nov. 2, 2012, Available at: https://cwiki.apache.org/ZOOKEEPER/gsocfailuredetector.data/gsoc-zookeeper-failuredetector.pdf.

Nunes, Raul Ceretta, "Self-Tuned Failure Detector", Retrieved on: Nov. 2, 2012, Available at: http://www.dsc.ufcg.edu.br/~fubica/papers/FD/Nunes2001.pdf.

De Sa, et al., "QoS Self-Configuring Failure Detectors for Distributed Systems", In 10th IFIP International Conference on Distributed Applications and Interoperable Systems, vol. 6115, Jun. 7, 2010, 14 pages.

Ren, et al., "Low-Overhead Accrual Failure Detector", In Proceedings of Sensors 2012, vol. 12, Issue 5, May 4, 2012, 9 pages.

Dixit, et al., "Timeout-Based Adaptive Consensus: Improving Performance through Adaptation", In Proceedings of the 27th Annual ACM Symposium on Applied Computing SAC, Mar. 22, 2012, 6 pages.

Al-Shishtawy, Ahmad, "Self-Management for Large-Scale Distributed Systems", Retrieved on: Nov. 2, 2012, Available at: http://www.diva-portal.org/smash/get/diva2:548547/FULLTEXT01.

* cited by examiner

IMPLEMENTING RATE CONTROLS TO LIMIT TIMEOUT-BASED FAULTS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are hosted and provided via a network of computing systems generally known as "the cloud." These applications may have many different components, running on many different computing nodes within the cloud. Each of the components has one or more dependencies on other hardware or software components. As such, each cloud-hosted application may have many different points of failure, whether hardware- or software-related.

BRIEF SUMMARY

Embodiments described herein are directed to implementing rate controls to limit faults detected by timeout and to learning and adjusting an optimal timeout value. In one embodiment, a computer system identifies cloud components that have the potential to fail within a time frame that is specified by a timeout value. The computer system establishes a number of components that are allowed to fail during the time frame specified by the timeout value and further determines that the number of component failures within the time frame specified by the timeout value has exceeded the established number of components that are allowed to fail. In response, the computer system increases the timeout value by a specified amount of time to ensure that fewer than or equal to the established number of components fail within the time frame specified by the timeout value.

In another embodiment, a computer system learns and adjusts an optimal timeout value. The computer system monitors a number of failures that occur due to timeout during a specified timeframe, where the timeouts are defined by a timeout value. The computer system determines that the timeout value is too high or too low based on the determined number of failures that occurred due to timeout during the specified timeframe and, in response, adjusts the timeout value to ensure that fewer than or equal to a specified number of failures occur during the specified timeframe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to implementing rate controls to limit faults detected by timeout and to learning and adjusting an optimal timeout value. In one embodiment, a computer system identifies cloud components that have the potential to fail within a time frame that is specified by a timeout value. The computer system establishes a number of components that are allowed to fail during the time frame specified by the timeout value and further determines that the number of component failures within the time frame specified by the timeout value has exceeded the established number of components that are allowed to fail. In response, the computer system increases the timeout value by a specified amount of time to ensure that fewer than or equal to the established number of components fail within the time frame specified by the timeout value.

In another embodiment, a computer system learns and adjusts an optimal timeout value. The computer system monitors a number of failures that occur due to timeout during a specified timeframe, where the timeouts are defined by a timeout value. The computer system determines that the timeout value is too high or too low based on the determined number of failures that occurred due to timeout during the specified timeframe and, in response, adjusts the timeout value to ensure that fewer than or equal to a specified number of failures occur during the specified timeframe.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
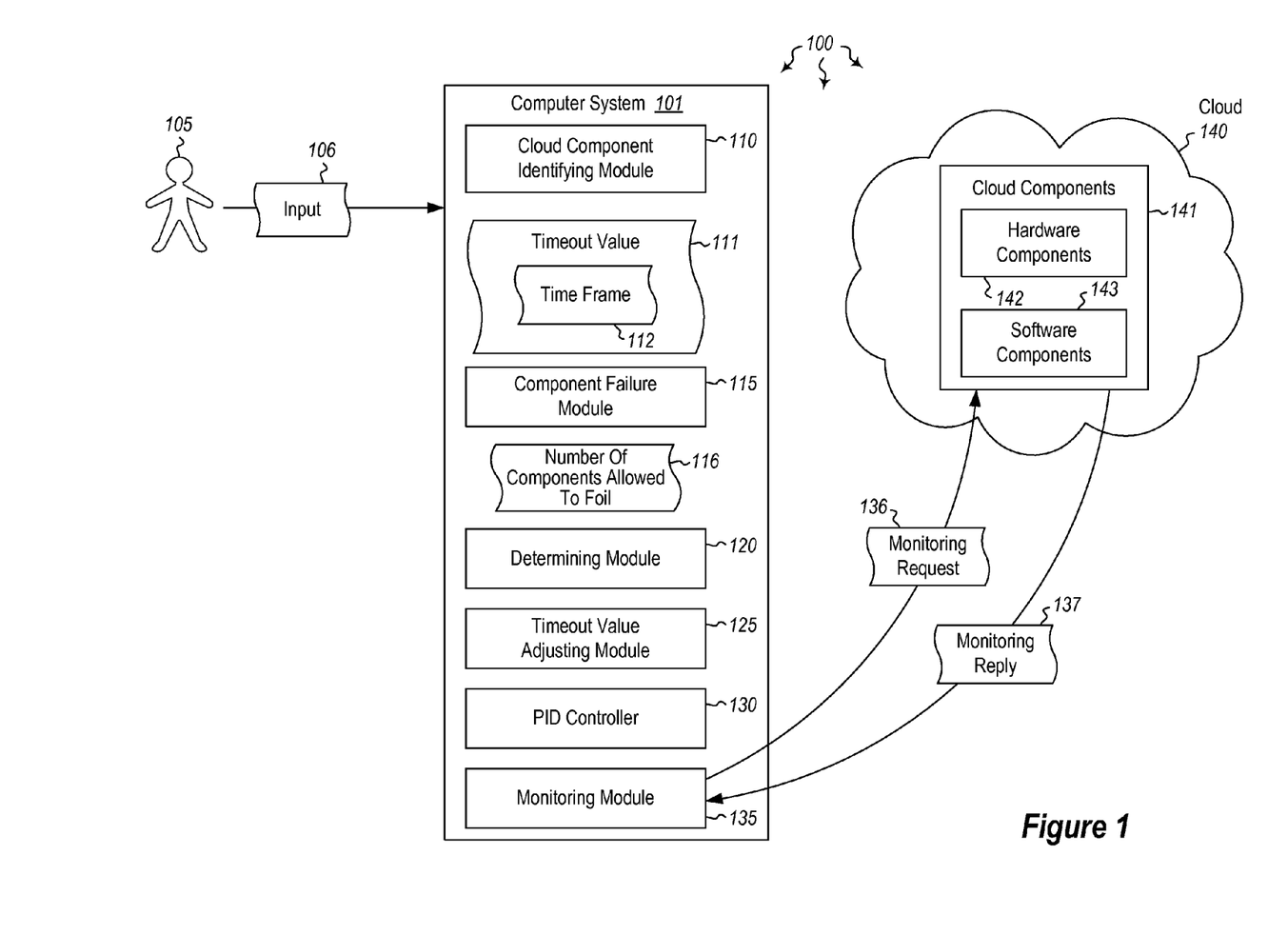
FIG. 1 illustrates a computer architecture in which embodiments described herein may operate including implementing rate controls to limit faults detected by timeout.

FIG. 1 illustrates a computer architecture 100 in which at least one embodiment may be employed. Computer architecture 100 includes computer system 101. Computer system 101 may be any type of local or distributed computer system, including a cloud computing system. The computer system includes modules for performing a variety of different functions. For instance, the cloud component identifying module 110 may identify components of cloud 140. These cloud components 141 may include hardware components 142 (e.g. processors, memory, hard drives, network cards, motherboards, peripheral devices, power supplies, routers, switches or other computer- or networking-related hardware), and/or software components 143 (e.g. applications, functions, methods, workflows, virtual machines (VMs) or other software-related components). In some cases, the cloud component identifying module 110 may be configured to identify any hardware or software components that have the potential of failing in their operation.

In a massively distributed system like cloud 140, failures (hardware or software) are bound to happen. Many such failures are timeout-based, meaning that if a component is unresponsive or is taking longer than a specified time, the task times out. Accordingly, many hardware and software components will be identified as faulty after a certain amount of time has elapsed. Falsely identifying a component as faulty (i.e. a "false positive") can lead to more harm than good. In cloud 140 (and with substantially any cloud), hardware and software components are interdependent. As such, timeout values cannot be set too aggressively. If they are too short, a large number of non-faulty components might be identified as being faulty. Moreover, timeout values can change over time due to changes in hardware, network conditions or other factors.

Embodiments described herein provide methods for adaptively and safely setting timeout values while limiting the number of false positives. Embodiments also set and adjust the number of retries (i.e. the number of times a restart is attempted for a component) for any particular hardware or software component. In some scenarios, for example, retries may be beneficial, while in others they may not. The nature of the processing load, or the nature of the failure may dictate whether (or how many) retries are to be attempted.

Rate controls may be implemented to handle timeouts and retries, as well as adapt them to a dynamic system. For timeouts, the number of faults detected by the component failure module 115 (e.g. due to timeout) may be limited, for example, to a rate of X per day, where X is a variable or fixed amount. In such cases, if more than X faults are detected due to timeout, then they are ignored as the rate control has been hit. Once the rate control has been hit, it is implicit that the timeout value (e.g. 111) needs to be increased. A new, larger value for the timeout is chosen by a user, by policy, by another software application, or by using a feedback controller such as a proportional-integral-derivative (PID) controller. Alternatively, the new, (larger) timeout value may be selected by measuring the fraction of actions where the timeout value was hit. In yet other cases, the new, (larger) timeout value may be chosen by implementing a parallel hypothesis testing system, that, for example, increases the timeout value to 2×, and chooses a specified number of actions with the timeout per day, and checks how many actually fail and how many succeed.

For retries, the number of retries may be chosen at some reasonable value (e.g. Y) and the probability of success is measured. A rate Z may be chosen per time period to try Y+1 retries on Z operations a day. If that increases the probability of success, the retry count may be increased to y+1. If the chosen value results in poor performance (i.e. the rate control is hit very soon), it may lead to reduced system functionality. As such, a safe timeout value may be selected that is large enough to ensure that the number of faults will be fewer than the rate control. The components may then be restarted with that timeout value. This safe timeout value may delay recovery, but keeps the functionality of timeout detection active even after the rate control is hit.

As will be described further below, the number of false positives is bounded by the rate control. Accordingly, even if a bad initial timeout value is chosen, its impact is limited by the rate control. The rate control itself may be rate controlled by an even smaller rate that increases the search space for the timeouts/retries, and assists in continual adjustment of the timeout value to minimize the time needed to identify a failure. In one example, minimizing timeouts or retries may be performed as follows: suppose for a given day, that user 105 is willing to recover 10 out of 1000 slow starting components (e.g. cloud components 141). Instead of analyzing data to find the best possible timeout, the user or the computer system 101 can pick a reasonable timeout value 111, and check if this timeout results in more than 10 faults in that day. If it does, then the timeout value adjusting module 125 increases the timeout value by a certain amount. This example thus allows timeout values to be adjusted and adapted, minimizes timeout values whenever possible, automatically adjusts to changing conditions, limits the number of false positives, and is simple to specify and test. These concepts will be explained further below with regard to methods 200 and 300 of FIGS. 2 and 3, respectively.

Figure 2:
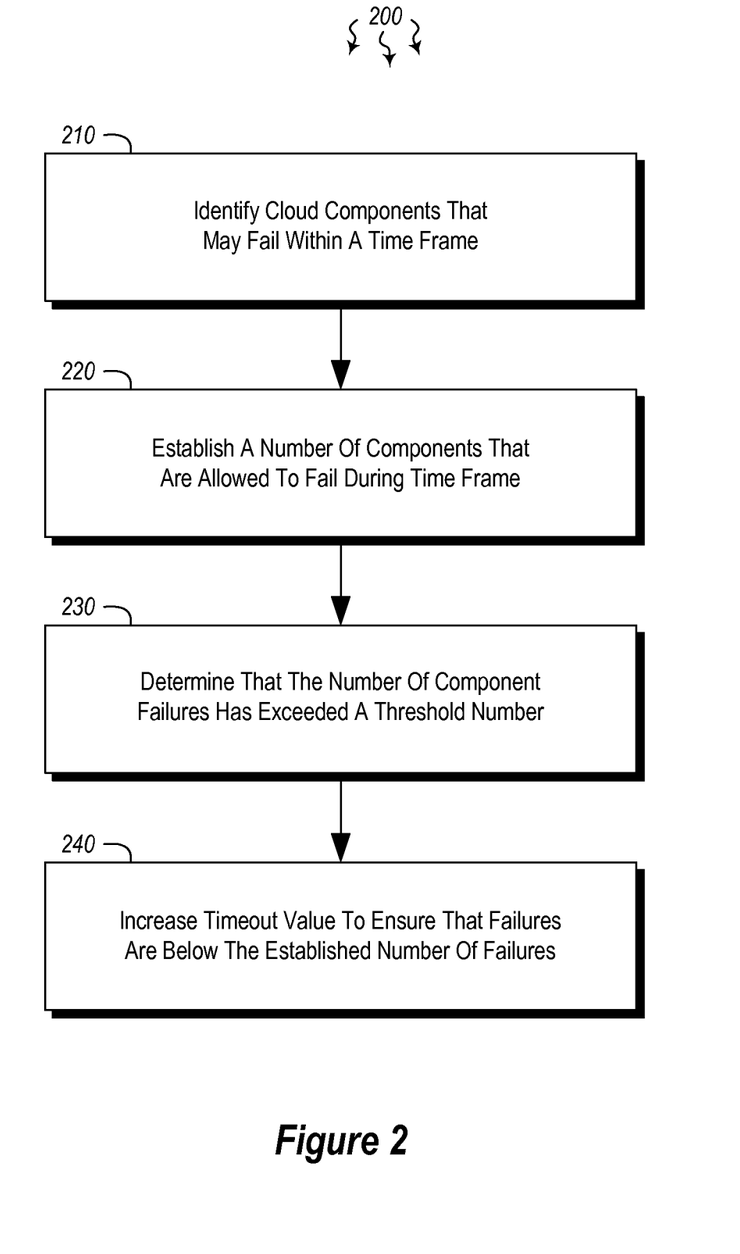
FIG. 2 illustrates a flowchart of an example method for implementing rate controls to limit faults detected by timeout.
Figure 3:
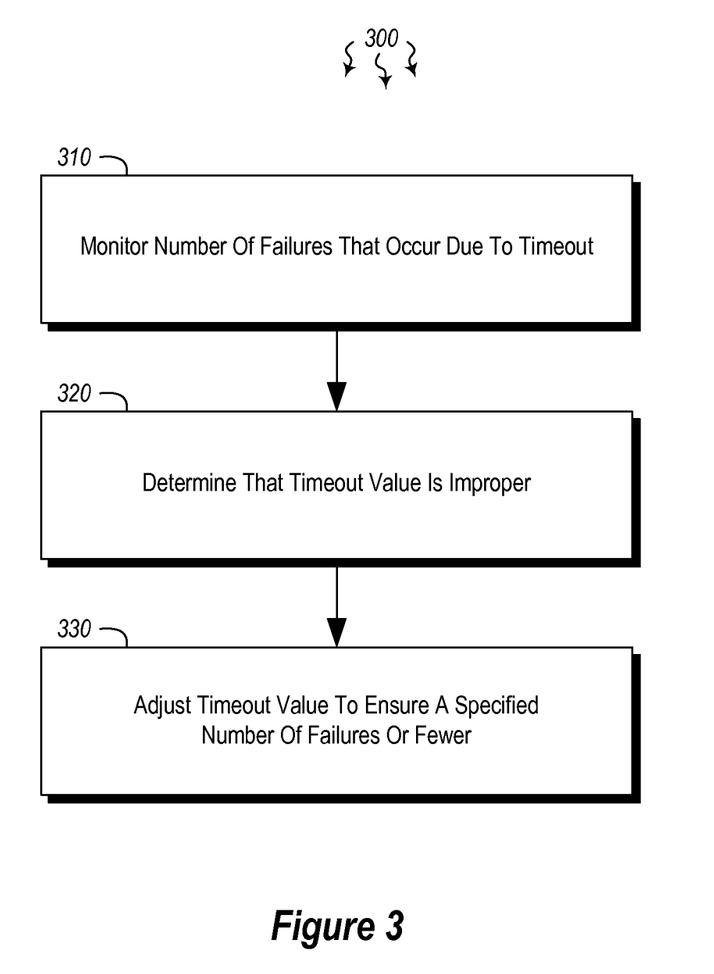
FIG. 3 illustrates a flowchart of an example method for learning and adjusting an optimal timeout value.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for implementing rate controls to limit faults detected by timeout. The method 200 will now be described with frequent reference to the components and data of environment 100.

Method 200 includes an act of identifying one or more cloud components that have the potential to fail within a time frame that is specified by a timeout value (act 210). For example, cloud component identifying module 110 may identify any of cloud hardware components 142 or cloud software components 143. As mentioned above, the hardware and software components may include any type of hardware or software, on substantially any level of granularity. For instance, hardware components 142 may include individual hardware components such as processors, or entire computer systems such as blades. Likewise, software components 143 may include individual processes, workflows or methods, or may include entire software applications or virtual machines. The identified components may include any combination of cloud components 141. This combination may come from one computer system or from multiple different computer systems in the same cloud or in different clouds.

Method 200 also includes an act of establishing a number of components that are allowed to fail during the time frame specified by the timeout value (act 220). For example, component failure module 115 may establish that five hardware components or ten software components 116 are allowed to fail during a time frame 112 (e.g. one minute, one hour, one day, one week, one month, etc.) specified by a timeout value 111. This timeout value may be determined by a user, by a software application, by policy or through some other means. In some cases, user 105 may indicate (using input 106) how many failures are allowed for a particular cloud, for a particular computer system or for a particular component.

In some cases, the established number of components that are allowed to fail during a given time frame is based on or is influenced by a value that indicates a number of cloud components that failed over a period of time. For instance, when determining a safe timeout value that is large enough to ensure that the number of faults will be fewer than a specified rate control, a number higher than the highest number of reported failures may be used. This higher number may include an added buffer value that ensures that a sufficiently high timeout value is in place to prevent more than the allowed number of components from failing.

Method 200 further includes an act of determining that the number of component failures within the time frame specified by the timeout value has exceeded the established number of components that are allowed to fail (act 230). The determining module 120 may determine that the number of component failures has exceeded the established number of components that are allowed to fail by monitoring the identified cloud components 141 using cloud component monitoring requests. For instance, monitoring module 135 may send monitoring request 136 to any one or more of the cloud computing systems of cloud 140. If the components of these cloud computing systems do not send a monitoring reply message 137 back to the monitoring module 135, then the monitoring module may determine that the component or node is unresponsive or that a network error has occurred, preventing transfer of the monitoring reply. These monitoring requests may be sent to the identified cloud components as requested by a user, or on a scheduled basis according to a specified schedule. The schedule may be established by the user 105 or by another application or workflow.

Method 200 includes an act of increasing the timeout value by a specified amount of time to ensure that fewer than or equal to the established number of components fail within the time frame specified by the timeout value (act 240). The timeout value adjusting module 125 may thus adjust the timeout value 111 higher to ensure that fewer components fail due to timeout. This will prevent the number of failed components from reaching the established rate control. This value may be adjusted up as far as is needed to prevent the rate control from being reached. After the number of failures has subsided, over time, the timeout value may be reduced in a controlled manner.

Thus, in some cases, the determining module 120 may determine that the number of component failures within the time frame specified by the timeout value is below the established number of components that are allowed to fail. The timeout value adjusting module 125 may decrease the timeout value by a specified amount of time that still ensures that fewer than or equal to the established number of components fail within the time frame 112 specified by the timeout value 111. The timeout value may be adjusted (either up or down) using a proportional-integral-derivative (PID) controller 130.

The number of components that are allowed to fail during the time frame specified by the timeout value may be dynamically adjusted over time. In some cases, a string of failures may lead the timeout value to be increased to reduce the number of timeout failures. On the other hand, an extended period without failures may lead the timeout value 111 to be reduced, thus allowing actual errors to be attended to quickly. Thus, the number of components that are allowed to fail may be dynamically adjusted to minimize the timeout value while ensuring that fewer than or equal to the established number of components fail within the time frame specified by the timeout value.

Increasing the timeout value by a specified amount of time to ensure that fewer than or equal to the established number of components fail within the time frame specified by the timeout value may prevent cascading component failures. As many cloud components 141 are interdependent, a failure of one component may affect another component, and so on down the line. If a non-faulty node is taken down because a short timeout value has indicated a timeout for that node, then other nodes dependent on that node may be affected. Accordingly, the timeout value may be increased to prevent cascading failures. The timeout value may be adjusted at specified time intervals (e.g. hourly, daily, weekly, etc.), or may be adjusted based on an established cloud management updating policy.

FIG. 3 illustrates a flowchart of a method 300 for learning and adjusting an optimal timeout value. The method 300 will now be described with frequent reference to the components and data of environments 100 and 400 of FIGS. 1 and 4, respectively.

Method 300 includes an act of monitoring a number of failures that occur due to timeout during a specified timeframe, the timeouts being defined by a timeout value (act 310). For example, monitoring module 135 may monitor the number of failures that occur due to timeouts for cloud components 141. The timeout value may be based on monitored time distributions for any of the following: application deployments, application updates, virtual machine migrations, node power-downs or other operations. The timeout value may be initially selected using average timeout values for each of the operations. The timeout values may then be adjusted based on the number of failures that are being reported due to timeout.

Figure 4A:
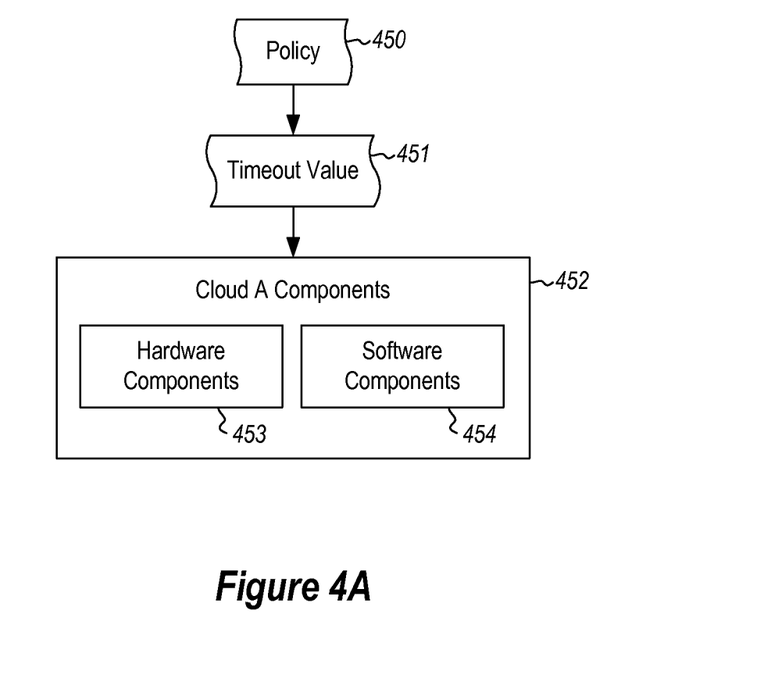
FIGS. 4A-4B illustrate embodiments in which policy controls timeout values for different hardware and software components.
Figure 4B:
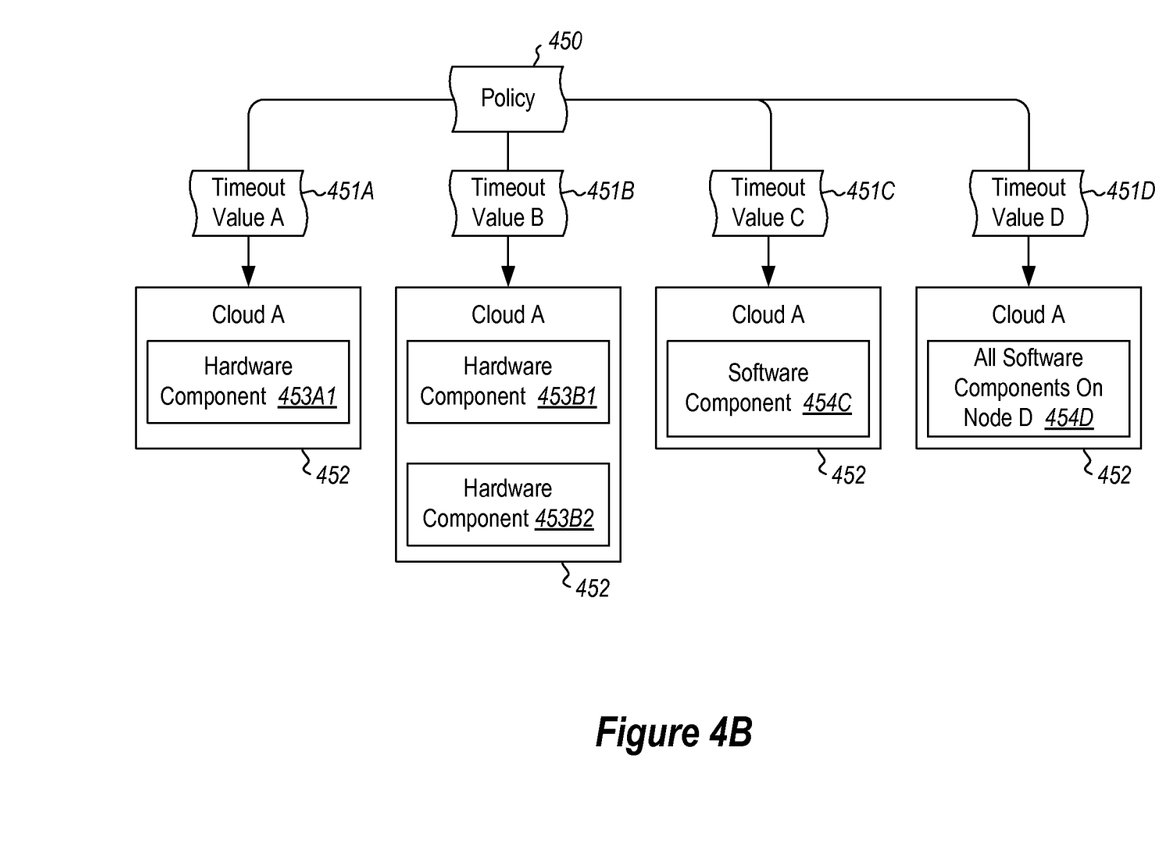

In some cases, a timeout value may apply to all hardware and software components for a given cloud, while in other cases, a separate timeout value may be specified for each identified cloud component. As shown in FIG. 4A, a policy 450 may indicate a timeout value 451 for each of cloud A components 452, including hardware components 453 and software components 454. Alternatively, as shown in FIG. 4B, a policy 450 may indicate a different timeout value for each component. For instance, timeout value A (451A) may be for a specific hardware component 453A1 among cloud A's components 452. Timeout value B (451B) may specify the same or different timeout values for the various different hardware components (453B1 and 453B2) of cloud A's components 452. Timeout value C (451C) may specify timeout values for a specific software component 454C, and timeout value D (451D) may specify timeout values for all of the software components 454D on a given node (e.g. Node D). Accordingly, a policy may include one or many different timeout values. The timeout values may apply to single hardware or software components or to multiple different groups of hardware or software components. Each timeout value may updated individually accordingly to a specified schedule (which itself may be specified in the policy 450) such as at specified time intervals, or may be adjusted manually as input by the user.

Method 300 further includes an act of determining that the timeout value is too high or too low based on the determined number of failures that occurred due to timeout during the specified timeframe (act 320). Thus, if the determining module 120 determines that the timeout value is too high (e.g. because the specified numbers per timeframe hit the rate control), then the timeout value will be increased. Accordingly, method 300 includes an act of adjusting the timeout value to ensure that fewer than or equal to a specified number of failures occur during the specified timeframe (act 330). The rate control thus ensures that only a specified number of failures occur within the given timeframe 112. Moreover, actions taken based on determinations of failure (such as powering down or rebooting a node) may be monitored and limited to prevent cascading failures. The timeout value adjusting module 125 may operate substantially autonomously, thus ensuring that the cloud components (and thus the cloud itself) do not create more timeout faults than the system can handle, and further ensures that the system can recover from smaller failures by preventing cascading failures.

Accordingly, methods, systems and computer program products are provided which implement rate controls to limit faults detected by timeout. Moreover, methods, systems and computer program products are provided which learn optimal timeout values and adjust them accordingly.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
 one or more processors;
 system memory;
 one or more computer-readable storage media having stored thereon computer-executable instructions that are executable by the one or more processors to cause the computing system to implement rate controls to limit faults detected by timeout and to instantiate the following;
  a monitor module that identifies one or more hardware or software components that have a potential to experience a timeout-based failure within a time frame, wherein the timeout-based failure is a failure in which the one or more hardware or software components is unresponsive for a specified time or takes longer to perform a task than the specified time, wherein the specified time is specified by a timeout value;
  a component failure module that establishes a number of timeout-based failures the one or more hardware or software components are allowed to suffer during the time frame;
  a determining module that determines that the number of timeout-based failures suffered by the one or more hardware or software components within the time frame has exceeded the established number; and
  a timeout value adjusting module that increases the timeout value by a specified amount of time to ensure that fewer than or equal to the established number of timeout-based failures occur within the time frame.

2. The computer system of claim 1, wherein the established number is based on a value that indicates a number of cloud components that failed over a period of time.

3. The computer system of claim 2, wherein the established number is based on the value plus a buffer value.

4. The computer system of claim 1, wherein the computer-executable instructions are further configured, when executed, to cause the computing system to determine
 that the number of timeout-based failures suffered by the one or more hardware or software components within the time frame is below the established number; and
 to decrease the timeout value by a specified amount of time.

5. The computer system of claim 4, wherein a proportional-integral-derivative (PID) controller is used to decrease the timeout value.

6. The computer system of claim 4, wherein the timeout value is dynamically adjusted over time.

7. The computer system of claim 6, wherein the timeout value is dynamically adjusted to minimize the timeout value while ensuring that fewer than or equal to the established number of timeout-based failures suffered by the one or more hardware or software components occur within the time frame.

8. The computer system of claim 1, wherein increasing the timeout value by a specified amount of time to ensure that fewer than or equal to the established number of timeout-based failures suffered by the one or more hardware or software components occur within the time frame prevents one or more cascading component failures.

9. The computer system of claim 1, wherein the determining module determines that the number of timeout-based failures has exceeded the established number in response to the monitoring module monitoring one or more hardware or software cloud components using cloud component monitoring requests.

10. The computer system of claim 9, wherein the monitoring requests are sent to the one or more hardware or software cloud components on a scheduled basis according to a specified schedule.

11. The computer system of claim 10, wherein the specified schedule is based on a user-established policy.

12. The computer system of claim 10, wherein the timeout value is adjusted at specified time intervals.

13. The computer system of claim 12, wherein the specified time intervals for adjusting the timeout value are listed in a cloud management policy.

14. The computing system of claim 1, wherein the computer system adjusts a number of retries that are permitted to occur for the one or more hardware or software components, each retry comprising an attempted restart for a corresponding hardware or software component.

15. A computer system comprising the following:
 one or more processors;
 system memory;
 one or more computer-readable storage media having stored thereon computer-executable instructions that are executable, by the one or more processors to cause, the computing system to perform learning and adjusting of a timeout value and to instantiate, the following:
  a monitor module that monitors a number of timeout-based failures of one or more hardware or software components that occur due to timeout during a specified timeframe, the timeouts being defined by the timeout value, and wherein the timeout value is based on monitored time distributions for at least one of the following: application deployments, application updates, virtual machine migrations or node power-downs;
  a determining module that determines that the timeout value is too high or too low based on the determined number of timeout-based failures that occurred due to timeout during the specified timeframe; and
  a timeout value adjusting module that adjusts the timeout value to ensure that fewer than or equal to a specified number of timeout-based failures occur during the specified timeframe.

16. The computer system of claim 15, wherein different component-specific timeout values are specified for a plurality of different components.

17. The computer system of claim 16, wherein the component-specific timeout values are adjusted according to a specified time interval.

18. The computer system of claim 17, wherein the component-specific timeout values are adjusted manually based on user input.

19. The computing system of claim 15, wherein the computer system adjusts a number of retries that are permitted to occur during the specified timeframe.

20. A computer system comprising the following:
one or more processors;
system memory;
one or more computer-readable storage media having stored thereon computer-executable instructions that are executable, by the one or more processors to cause the computing system to perform a method for learning and adjusting a timeout value and to instantiate the following:
a monitor module that monitors one or more hardware or software components for a number of hardware or software timeout-based failures of the one or more hardware or software components that occur due to timeout during a specified timeframe, each of the timeout-based failures comprising a failure in which the one or more hardware or software components is unresponsive for a specified time or takes longer to perform a task than the specified time, wherein the specified time is by the timeout value;
a determining module that determines that the timeout value is too high or too low based on the determined number of failures that occurred due to timeout during the specified timeframe; and
a timeout value adjusting module that adjusts the timeout value to ensure that fewer than or equal to a specified number of failures occur during the specified timeframe; and
wherein the computer system adjusts a number of retries that are permitted to occur for the one or more hardware or software components, each retry comprising an attempted restart for a corresponding hardware or software component.

\* \* \* \* \*